(12) United States Patent
Biechele

(10) Patent No.: US 11,545,713 B2
(45) Date of Patent: Jan. 3, 2023

(54) HOUSING HAVING AT LEAST ONE FIRST AND ONE SECOND HOUSING PART

(71) Applicant: FAZUA GMBH, Ottobrunn (DE)

(72) Inventor: Johannes Biechele, Ottobrunn (DE)

(73) Assignee: PORSCHE EBIKE PERFORMANCE GMBH, Ottobrunn (DE)

( * ) Notice: Subject to any disclaimer, the term of this patent is extended or adjusted under 35 U.S.C. 154(b) by 0 days.

(21) Appl. No.: 17/429,557

(22) PCT Filed: Feb. 11, 2020

(86) PCT No.: PCT/EP2020/053477
§ 371 (c)(1),
(2) Date: Aug. 9, 2021

(87) PCT Pub. No.: WO2020/165173
PCT Pub. Date: Aug. 20, 2020

(65) Prior Publication Data
US 2022/0094008 A1 Mar. 24, 2022

(30) Foreign Application Priority Data
Feb. 11, 2019 (DE) ..................... 10 2019 103 295.4

(51) Int. Cl.
*H01M 50/249* (2021.01)
*H01M 50/262* (2021.01)
*H01M 50/264* (2021.01)

(52) U.S. Cl.
CPC ....... *H01M 50/249* (2021.01); *H01M 50/262* (2021.01); *H01M 50/264* (2021.01); *H01M 2220/20* (2013.01)

(58) Field of Classification Search
CPC .......................... H01M 50/262; H01M 50/264
See application file for complete search history.

(56) References Cited

U.S. PATENT DOCUMENTS

| 2010/0307848 A1 | 12/2010 | Hashimoto et al. |
| 2011/0236740 A1* | 9/2011 | Paolazzi .............. H01M 10/613 429/151 |

(Continued)

FOREIGN PATENT DOCUMENTS

| DE | 102012000996 A1 | 7/2013 |
| DE | 102014217523 A1 | 3/2016 |

(Continued)

OTHER PUBLICATIONS

International Search Report dated Apr. 14, 2020 re: Application No. PCT/EP2020/053477, pp. 1-2, citing: DE 102016225663 B3, US 2010307848 A1, DE 202016006515 U1, DE102014217523 A1, DE102012000996 A1 and WO 2013045530 A2.

(Continued)

*Primary Examiner* — Jonathan G Jelsma
(74) *Attorney, Agent, or Firm* — Cantor Colburn LLP

(57) ABSTRACT

A housing, particularly a battery housing, includes at least one first housing part, at least one second housing part, and at least one connecting member connecting the first housing part to the second housing part. The first housing part and the second housing part are configured such that, in an interconnected state, they separate a housing interior space from an environment situated on the other side of the first housing part and the second housing part. The housing is characterized in that the at least one connecting member is configured as a profile rail engaged with the first housing part and with the second housing part.

13 Claims, 6 Drawing Sheets

(56) References Cited

U.S. PATENT DOCUMENTS

| | | | | |
|---|---|---|---|---|
| 2013/0108909 A1* | 5/2013 | Matsuo | ................ | H01M 50/211 |
| | | | | 429/100 |
| 2014/0120413 A1* | 5/2014 | Nielsen | ............... | H01M 50/109 |
| | | | | 429/185 |
| 2019/0312245 A1* | 10/2019 | Schröder | ............. | H01M 50/262 |

FOREIGN PATENT DOCUMENTS

| | | | |
|---|---|---|---|
| DE | 202016006515 U1 | | 11/2016 |
| DE | 102016225663 B3 | | 6/2018 |
| WO | 2013045530 A2 | | 4/2013 |
| WO | WO-2016093540 A1 | * | 6/2016 |

OTHER PUBLICATIONS

International Preliminary Report on Patentability dated May 6, 2021 re: PCT/EP2020/053477, pp. 1-4, citing: DE 102016225663 B3, US 2010307848 A1, DE 202016006515 U1, DE102014217523 A1, DE102012000996 A1 and WO 2013045530 A2.

\* cited by examiner

HOUSING HAVING AT LEAST ONE FIRST AND ONE SECOND HOUSING PART

TECHNICAL FIELD

The present disclosure relates to a housing, particularly a battery housing, comprising at least one first housing part, at least one second housing part, and at least one connecting member connecting the first housing part to the second housing part, wherein the first housing part and the second housing part are configured such that, in an interconnected state, they separate a housing interior space from an environment situated on the other side of the first housing part and the second housing part.

BACKGROUND

From the prior art, many housings are known that are composed of several housing parts, wherein the housing parts can be connected to one another in different ways. For example, the housing interior space and the components disposed therein can be protected from the environment and external influences, such as moisture or dust, by the housing interior space being enclosed or encapsulated by the housing parts. Particularly in the case of housings for electrical components, e.g. for a battery or a rechargeable battery of, for example, an electric bicycle, reliable protection is necessary.

Here, the housing interior space can be protected by the housing parts being glued and welded together at their abutting contact surfaces, for example. A permanent connection is thus created. However, one drawback is that this connection cannot easily be detached again, and that the housing thus cannot be easily disassembled and assembled several times. A replacement or inspection of components disposed in the housing interior space is not easy to realize. Moreover, the assembly process for closing the housing, i.e. the process of connecting the housing parts with each other, is very laborious.

Screw connections are known from the prior art as an alternative method for connecting housing parts. In this case, however, one problem is that the connection regions between the housing parts are not uniformly subjected to loads and are not compressed uniformly. Thus, connection forces of different strengths act on different regions along the contact surfaces between the housing parts. Thus, a localized compression in the region of the connecting members, i.e. the region of the screws, is the result. On the one hand, this is disadvantageous in that a seal that may possibly be provided is not uniformly compressed. On the other hand, it is disadvantageous that very rigid housing materials have to be provided, so that the less-compressed portions between two strongly compressed connection regions are also securely sealed. Moreover, the assembly process is laborious in that tools need to be used. Finally, screw bosses generally also have to be provided for the screws, which are disadvantageous in that the housing thus requires much space, and no uniform outer surface of the housing can be attained, or only with a greater use of material. Disadvantageously, this also results in a higher weight of the housing.

The use of latching clips, i.e. positive clips for latching together housing parts, as connecting members constitutes another alternative. In this case, this is disadvantageous in that such connecting members can become detached again too easily. Accordingly, there is the danger, in the case of impacts against the housing from the outside or if the housing falls down, of the latching clips becoming detached so that the housing parts are no longer securely connected to each other.

DE 10 2016 225663 B3 relates to a battery housing consisting of housing parts, in which battery housing fastening members are provided for non-positively connecting the housing parts.

US 2010/307848 A1 relates to a housing with housing parts in which clips are provided for connecting the housing parts.

DE 20 2016 006515 U1, DE 10 2014 217523 A1, DE 10 2012 000996 A1, and WO 2013/045530 A2 relate to further general prior art regarding housings.

SUMMARY

The disclosure therefore provides a housing that can be easily assembled and disassembled and, at the same time, provides a reliable and permanent protection of the housing interior space from the environment. In particular, the effort for an assembly process should be as small as possible and, at the same time, a compact solution with little expenditure in material and small weight should be provided.

According to the disclosure, this advantage is achieved by providing a device according to the independent claim 1. Advantageous embodiments and variants of the disclosure become apparent from the dependent claims and the following description. The features cited individually in the claims may thus be combined in any technologically meaningful manner both with each other and with the features presented in more detail in the following description, and can represent other advantageous embodiment variants of the disclosure.

The housing according to the disclosure comprises at least one first housing part, at least one second housing part, and at least one connecting member connecting the first housing part to the second housing part. Here, the first housing part and the second housing part are configured such that, in an interconnected state, they separate a housing interior space from an environment situated on the other side of the first housing part and the second housing part. The housing is characterized in that the at least one connecting member is configured as a profile rail engaged with the first housing part and with the second housing part.

Thus, the housing according to the disclosure is simple to assemble, and moreover, can be disassembled if necessary, and at the same time reliably protects components disposed in the housing interior space. A consistent connecting member providing for a uniform positive connection between the housing parts to be connected is provided by the profile rail. Along its entire extent, the profile rail thus ensures uniform properties in the connection region, i.e. in particular uniform connection forces, between the first housing part and the second housing part.

Thus, compared to connecting means provided at individual connection regions, such as screws, no regions with different degrees of compression are produced at the contact surfaces, i.e. there is no merely local compression. Thus, less rigid housing materials may be used because the less-compressed sealed sections between the screwing points are dispensed with. Moreover, the need for providing screw bosses is removed, whereby more compact and, with respect to weight, lighter housings can be obtained. Moreover, the need for using tools during the assembly process is removed, because the profile rail can be pushed into the provided recesses in a simple manner, even manually.

Compared with other positive connecting means, such as latching clips that bring into engagement the housing parts that are to be connected, a housing is provided that is more secure with respect to the connecting means becoming detached again. The elongate extent of the profile rail, which is in engagement with the housing parts via provided recesses, ensures that, even in the case of impacts against the housing or of the housing falling down, there is considerably less danger of the connecting member moving out of its recess again, compared to latching clips.

If necessary, a permanent connection between the housing parts which is not non-destructive again can be obtained in the present case by providing profile rails as connecting members. For this purpose, the engaged profile rails can be sealed so that their positive fit with the two housing portions cannot be detached in a non-destructive manner. After engaging the profile rails with recesses provided on the housing parts or with the intended accommodating space for positively accommodating the profile rails, for example, this positive fit may be configured so that it cannot be detached again in a non-destructive manner, by closing off, e.g. with glue, these recesses or this accommodating space after pushing the profile rails into the recess or the intended accommodating space. It is also conceivable that the profile rails are pushed into recesses provided in the housing parts or into the intended accommodating space in order to connect the housing parts, wherein this pushing-in cannot be undone at all, or only with difficulty. For example, this can be accomplished by the profile rails first having to be pushed against resistance over a blocking member provided in the recesses or the accommodating space. Once they are placed completely in their intended positions in the recesses or the accommodating space, the profile rails can no longer, or only with great difficulty, be pulled out in a non-destructive manner in the opposite direction against the resistance caused by the blocking member.

In general, the housings may also be configured such that the profile rails provided as connecting members for the housing parts are combined with other common connecting members known from the prior art, such as screws or latching clips.

For example, the housing may be used as a battery housing, among other things for a bicycle, particularly an electric bicycle, by inserting the rechargeable battery for supporting the drive unit of the electric bicycle into the housing and thus reliably protecting it against external weather-related influences. The housing may then be mounted to a frame of the electric bicycle with other mounting means. Moreover, the housing may also generally be used as a machine housing, and protect components disposed in the housing interior space from external influences.

According to a first advantageous embodiment of the disclosure, at least one seal may be disposed between the first housing part and the second housing part, situated on the side of the profile rail facing towards the housing interior space. Thus, the housing interior space is safely protected from external influences from the environment. In this case, the seal may be disposed between the two abutting contact surfaces of the housing parts to be connected. The seal may be configured to extend completely around the housing interior space, or be provided only at partial sections, e.g. at individual housing side walls.

According to the disclosure, the first housing part and the second housing part are configured such that they abut against each other and form a first contact surface and a second contact surface in the interconnected state. Moreover, at least the first housing part has a first hook portion in the region of the first contact surface. In this case, the profile rail has a first claw-shaped portion reaching behind the first hook portion in the interconnected state of the first housing part and the second housing part.

Also preferably, the second housing part may have a second hook portion in the region of the second contact surface, wherein the profile rail may have a second claw-shaped portion reaching behind the second hook portion in the interconnected state of the first housing part and the second housing part.

By forming claw-shaped portions on the profile rail, which reach behind the hook portions of the housing parts, an embodiment of the housing with a particularly simple design is provided. The housing is simple to assemble and disassemble. A renewed detachment of the connecting member is effectively prevented by the claw-shaped portions reaching behind the hook portions of the housing parts.

According to the disclosure, the first housing part, the second housing part and the profile rail, in the interconnected state, are engaged with each other in such a way that the first claw-shaped portion of the profile rail and a first groove of the first housing part disposed on a side of the first hook portion facing towards the housing interior space form an interference fit.

Also preferably, the first housing part, the second housing part and the profile rail, in the interconnected state, may further be engaged with each other in such a way that the second claw-shaped portion of the profile rail and a second groove of the second housing part disposed on a side of the second hook portion facing towards the housing interior space form an interference fit.

The formation of interference fits ensures that a uniform pressing action is caused in the connection region between the housing parts, i.e. the contact regions or contact surfaces are uniformly pressed together, and a seal which is possibly provided is uniformly compressed. A reliable and uniform seal of the housing interior space with respect to the environment is obtained. The interference fit between the profile rail and the housing parts moreover ensures that tolerance-related dimensional deviations are compensated while a secure connection between the housing parts is nevertheless ensured. The contact surfaces of the housing parts always abut against each other, and a defined compression of the seal is ensured.

According to another embodiment, at least one interference member protruding from the bottom of the first groove, in particular at least one rib or one stud, can be provided in order to form the interference fit between the first claw-shaped portion and the first groove.

Also preferably, at least one interference member protruding from the bottom of the second groove, in particular at least one rib or one stud, may be provided in order to form the interference fit between the second claw-shaped portion and the second groove.

Instead of in the shape of ribs or studs, the interference members may alternatively also be configured in the shape of other geometries extending from the bottom of the grooves. The ribs or, in general, the interference members provide for a reduction of the provided accommodating space for the profile rail or its claw-shaped portions. The accommodating space is reduced by the ribs or interference members providing excess material in the grooves. Thus, an interference fit is obtained between the profile rail and housing parts, or between claw-shaped portions and the grooves of the housing parts. A material overlap between the profile rail and the two housing parts is ensured by means of the ribs or interference members. The interference fit ensures that tolerance-related dimensional deviations are compensated while a secure connection between the housing parts is nevertheless ensured. The contact surfaces of the housing parts always abut against each other, and a defined compression of the seal is ensured.

According to another embodiment, at least one first outer side of the first housing part facing away from the housing interior space, preferably also a second outer side of the second housing part facing away from the housing interior space, may be configured to be flush with an outer side of the profile rail facing away from the housing interior space in the interconnected state of the first housing part and the second housing part. Thus, the profile rail can be embedded into the housing so as to be flush with the surface. This makes the entire look appear more homogeneous, and a jamming of or injury on parts protruding from the housing surface can be prevented in this manner. A surface-flush design of the housing can be obtained, without any members or edges protruding from the outer surfaces of the housing.

In addition or as an alternative, in the interconnected state, the at least one first housing part and the at least one second housing part may enclose the housing interior space in such a way that they form at least four housing side walls that are preferably substantially perpendicular to one another, wherein at least one profile rail is respectively provided as a connecting member on at least one, in particular on three, preferably on four, of the four housing side walls. A design of a housing that is very easy to handle is thus obtained, because the housing parts can be brought together in a first step and connected with one another in a second step, by inserting or pushing in the profile rails on at least one side of the housing.

In an embodiment with at least one housing wall that is not provided with a profile rail, a hinge joint may be provided at this housing side wall, for instance. In that case, the housing parts may already be movably connected with each other by means of the hinge joint, so that the housing parts can be brought one on top of the other as intended subsequent to closing the hinge joint. In a next step, the housing parts can then be interconnected as intended by at least one profile rail being inserted, as a connecting member, at at least one of the other housing side walls.

According to another embodiment, in the interconnected state, the at least one first housing part and the at least one second housing part may enclose the housing interior space in such a way that they form at least four housing side walls that are preferably substantially perpendicular to one another, and that at least two profile rails are provided as a connecting member on at least one housing side wall. These profile rails may, for example, be pushed into their intended accommodating space from two opposite mounting directions. Thus, the manufacturing costs for housings in different sizes can be reduced because uniform profile rails in uniform sizes or lengths are being provided for closing off or manufacturing housings of different sizes, including housing parts of different sizes or housing interior spaces of different sizes.

In the present case, substantially perpendicular housing side walls means that the plane formed by the respective housing side wall extends perpendicular to the plane formed by the adjacent housing side wall. The resulting corners of the housing formed by two adjacent housing side walls may in this case be configured to be rounded off, so that no sharp right-angled edge has to be formed between two adjacent substantially perpendicular housing side walls.

According to another embodiment, the housing may be configured such that the profile rail is arranged such that it reaches over a corner of the housing formed by two housing side walls disposed adjacent to each other.

According to another embodiment of the housing, at least one attachment member for positively connecting the housing to a retaining device may be provided on the outer side of the profile rail facing away from the housing interior space. The external retaining device may be the electric bicycle, for instance, to which the housing and the battery, which is disposed therein, for instance, can thus be positively attached in a simple manner. A mechanical interlock of the housing with the environment or with the external retaining device can advantageously be obtained. In this case, it is particularly advantageous that the attachment members are provided on the profile rail or rails. Thus, material and space can be saved in a simple manner, because the profile rail may serve not only for connecting the housing parts but also for attaching the housing to the environment. Therefore, attachment members that are to be mounted additionally, such as additional latching means, may be dispensed with.

According to another embodiment, the attachment member may be configured as a projection, latching lug or multi-tooth latching member. A rapid positive connection between the housing and the external retaining device can thus be obtained in an advantageous manner. Rapid assembly is possible, and also with simple steps, which is advantageous particularly when the housing is used as a battery housing and when attaching it to an electric bicycle, because few steps and, furthermore, no particular tool are needed for mounting the housing on the retaining device.

According to another embodiment of the housing, a retaining device may be positively connected to the housing via the attachment member.

Further advantages, special features and useful developments of the disclosure become apparent in the following from the exemplary embodiments explained below. In detail:

It is noted that the same reference signs in the different Figures refer to the same components. Descriptions given with reference to one component in one Figure also apply to the other Figures, and a repetitive description is avoided.

Figure 1:
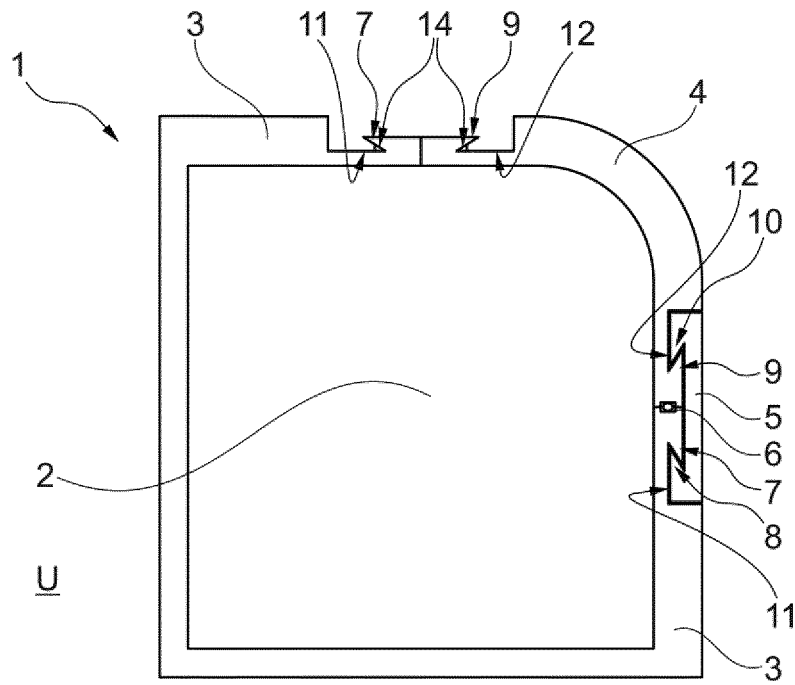
FIG. 1 shows an exemplary embodiment of the housing according to the disclosure in a sectional side view in a state of the first housing part being at least partially connected to the second housing part.

An exemplary embodiment of a housing 1 according to the disclosure is shown in sectional side view in FIG. 1. The housing 1 protects a housing interior space 2 from an environment U. The housing 1 has a multi-part configuration and comprises a first housing part 3 and a second housing part 4. The first housing part 3 and the second housing part 4 are generally joined by connecting members; in the present case, the first housing part 3 and the second housing part 4 are at least partially joined by a profile rail 5. In an assembled state, i.e. in an interconnected state of the first housing part 3 and the second housing part 4, the first housing part 3 and the second housing part 4, together with the connecting members, separate the housing interior space 2 from the environment U. For example, the purpose of this separation is that no moisture and no dust or other unwanted contamination enter the housing interior space 2 from the outside, i.e. from the environment U.

For example, the housing 1 may be used as a battery housing, among other things for a bicycle, particularly an electric bicycle, by inserting the rechargeable battery for supporting the drive unit of the electric bicycle into the housing 1 and thus reliably protecting it against external weather-related influences. The housing 1 may then be mounted to a frame of the electric bicycle with other mounting means. Alternatively, a housing according to the disclosure may also generally be used as a machine housing, and protect components disposed in the housing interior space 2 from external influences.

In FIG. 1, the housing 1 is depicted in a state of the first housing part 3 being at least partially connected to the second housing part 4. Thus, the housing 1 has two connection regions between the first housing part 3 and the second housing part 4, one connection region depicted at the upper end of the housing 1, at which no connecting member or profile rail 5 is yet provided, and one connection region depicted at the right-hand end of the housing 1, at which one connecting member in the form of the profile rail 5 is already provided.

At the connection region between the first housing part 3 and the second housing part 4, the two housing parts 3 and 4 abut against each other and form an abutting surface or contact surface. As is apparent from FIG. 1 in conjunction with FIG. 2, the first housing part 3 and the second housing part 4 are configured such that they abut against each other in the interconnected state, and in the process, the first housing part 3 forms a first contact surface 3', or the second housing part 4 forms a second contact surface 4'.

Moreover, a seal 6, which protects the housing interior space 2 more reliably from external influences, is provided in the right-hand connection region of the housing 1. The seal 6 is disposed between the first housing part 3 and the second housing part 4, situated on the side of the profile rail 5 facing towards the housing interior space 2.

Figure 2:
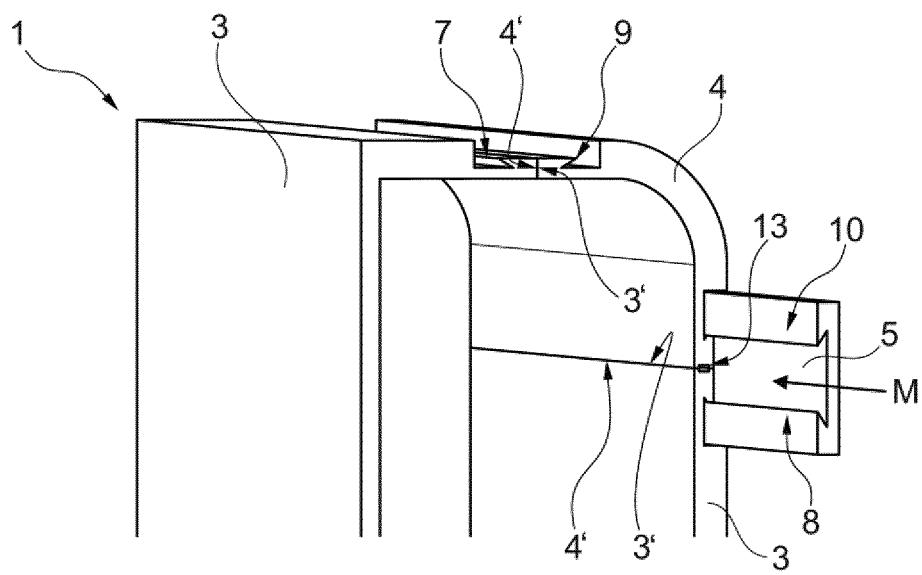
FIG. 2 shows a part of the housing of FIG. 1 in a perspective view during the process of connecting the first housing part to the second housing part.

In order to securely connect the first housing part 3 to the second housing part 4, the profile rail 5 is provided, which is in engagement with the first housing part 3 and the second housing part 4. There is a positive fit between the first housing part 3, the second housing part 4 and the profile rail 5. For this purpose, the first housing part 3 has a first hook portion 7 in the region of the first contact surface 3' (FIG. 2). Furthermore, the profile rail 5 has a first claw-shaped portion 8 reaching behind the first hook portion 7 in the interconnected state of the first housing part 3 and the second housing part 4. The second housing part 4 also has a second hook portion 9 in the region of the second contact surface 4' (FIG. 2), wherein the profile rail 5 further has a second claw-shaped portion 10 reaching behind the second hook portion 9 in the interconnected state of the first housing part 3 and the second housing part 4.

The first claw-shaped portion 8 reaches behind the first hook portion 7 by the first claw-shaped portion 8 of the profile rail 5 reaching into a first groove 11 of the first housing part 3, which is disposed on the side of the first hook portion 7 facing towards the housing interior space 2. This applies analogously for the second claw-shaped portion 10 reaching behind the second hook portion 9. The first housing part 3, the second housing part 4 and the profile rail 5, in the interconnected state, are thus engaged with each other in such a way that the first or second claw-shaped portion 8 or 10 of the profile rail 5 reaches into the first groove 11 or into a second groove 12 of the second housing part 4 disposed on a side of the second hook portion 9 facing towards the housing interior space 2. Thus, the first or second groove 11 or 12 constitute recesses for the profile rail 5. These recesses extend along or parallel to the outer wall of the housing 1, so that the profile rail 5 also extends along or parallel to the outer wall of the housing 1. Thus, in contrast to other prior-art connecting members, such as screws or latching clips, the connecting member in the present case does not extend from the outer wall of the housing 1 in the direction of the housing interior space 2. Therefore, there is also more space available for the connecting member compared with those of the prior art, in which the thickness of the wall of the housing 1 is the only space available. In the present case, a more secure connection between the housing parts 3 and 4 is therefore ensured without an increased material expenditure or increased weight of the housing being necessary. However, the depicted type of connection by providing the profile rail 5 as a connecting member may also be supplemented with the use of common joining techniques or connecting means, such as screw connections or latching connections.

Based on the connection region shown on the right-hand side, it is apparent from FIG. 2 that a cavity 13 formed by recesses in the first and second contact surfaces 3' and 4' is intentionally provided at the abutting region between the first housing part 3 and the second housing part 4. This cavity 13 serves for accommodating the seal 6.

As is further apparent in the illustration during the process of connecting the first housing part 3 to the second housing part 4 in FIG. 2, the profile rail 5 may simply be pushed into the provided recesses of the first and second housing parts 3 and 4 for assembly, without tools having to be used, for example. The profile rail 5 is inserted in a direction extending parallel or along the grooves 11 or 12, i.e. also along or parallel to the outer wall of the housing 1. Thus, this pushing direction, or generally mounting direction M, is no longer perpendicular to the outer wall of the housing 1, as is the case in the screws or latching clips of the prior art. Moreover, the profile rail 5 can be mounted manually and without using any special tools.

Figure 3:
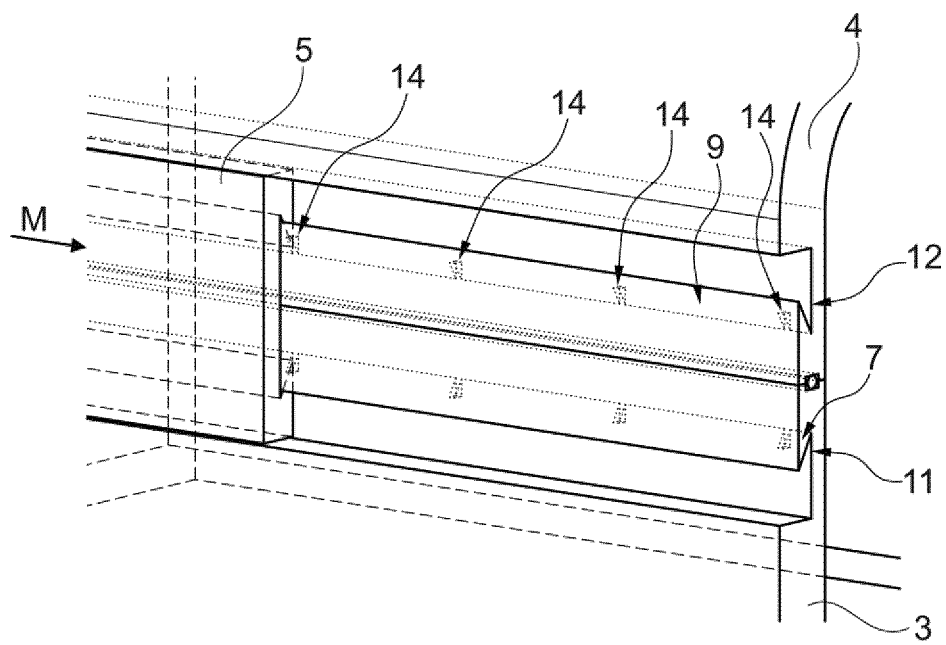
FIG. 3 shows a detailed view of the connection region of the first housing part and the second housing part of the housing of FIG. 1 in a side view, during the process of connecting the first housing part to the second housing part.
Figure 4:
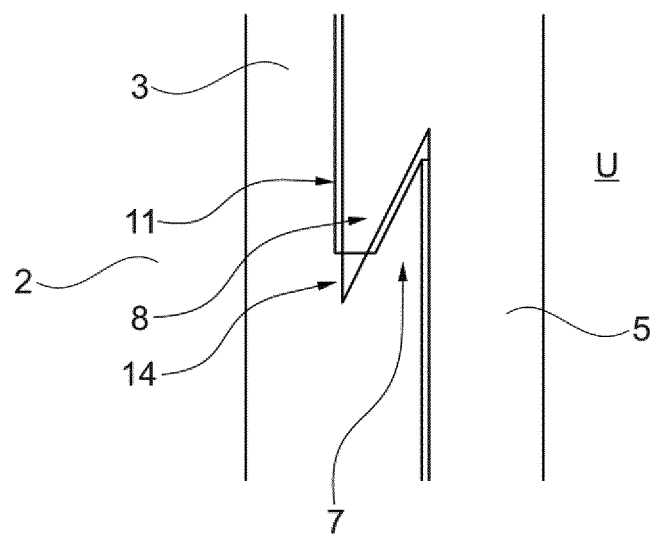
FIG. 4 shows a detailed view of the connection region of the first housing part and the profile rail of the housing of FIG. 1 in a side view.

As can be seen in FIG. 1 at the upper connection region, and in detail in FIG. 3 and FIG. 4, ribs 14 are also provided in the first groove 11 and in the second groove 12. The ribs 14 constitute interference members protruding from the bottom of the first or second groove 11 or 12. Alternatively or additionally, these interference members may also be configured in the shape of studs, or in the shape of other geometries extending from the bottom of the grooves 11 or 12, instead of being configured in the shape of ribs 14. In this manner, the ribs 14 or interference members provide for a reduction of the accommodating space for the first or second claw-shaped portion 8 or 10 of the profile rail 5 provided by the first or second groove 11 or 12. The accommodating space is reduced by the ribs 14 or interference members providing excess material in the grooves 11 or 12. Thus, an interference fit between the first or second claw-shaped portion 8 or 10 of the profile rail 5 and the first or second groove 11 or 12 of the first or second housing part 3 or 4 is obtained.

The interference fit produced by the ribs 14 is shown in detail in FIG. 3 and FIG. 4. The interference fit between the profile rail 5 and the two housing parts 3 and 4 ensures that tolerance-related dimensional deviations are compensated while a secure connection between the housing parts 3 and 4 is nevertheless ensured. A material overlap between the profile rail 5 and the two housing parts 3 and 4 is ensured by means of the ribs 14. In this case, cuts are made in the ribs 14 by the profile rail 5 or the first or second claw-shaped portion 8 or 10 of the profile rail 5 during the mounting process. In this way, the contact surfaces 3' and 4 always abut against each other in the interconnected state of the first housing part 3 and the second housing part 4. Because of the positive fit between the profile rail 5 and the two housing parts 3 and 4, a non-positive fit between the first housing part 3 and the second housing part 4 is produced at the same time, because the two housing parts 3 and 4 are pressed together or compressed at their contact surfaces 3' and 4'. Thus, a defined compression of the seal 6 is also ensured.

Moreover, various blocking members may also be provided in the grooves 11, 12, or generally in the accommodating space provided for the profile rail 5. For example, a detachment, which is not non-destructive, of the connection of the housing parts 3, 4 or an opening of the housing 1 that is not non-destructive can thus be ensured. For example, the accommodating space for the profile rail 5 may be sealed or glued after the profile rail 5 has been brought fully into its intended position along the mounting direction M and the housing has thus been successfully closed. Then, the profile rail 5 can no longer be pulled out in an opposite direction to the mounting direction M. Alternatively, blocking members could already be provided in the accommodating space, e.g. in the grooves 11, 12, wherein the profile rail 5 is capable of overcoming these blocking members when it is pushed in along the mounting direction M, but thereafter, the profile rail 5 cannot be pushed back in an opposite direction to the mounting direction M from its intended position closing the housing 1.

Figure 5:
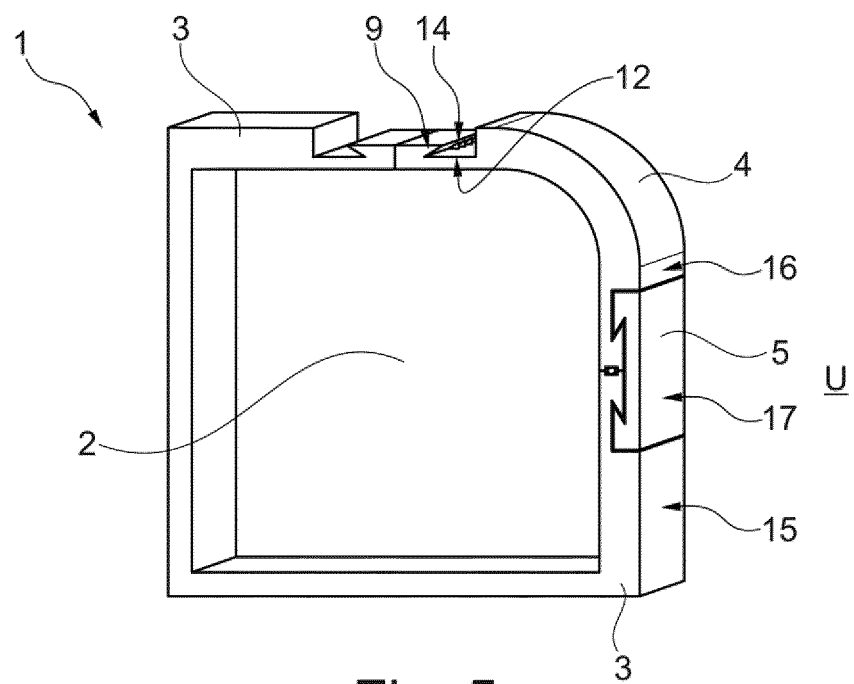
FIG. 5 shows a part of the housing of FIG. 1 in another perspective view.
Figure 6:
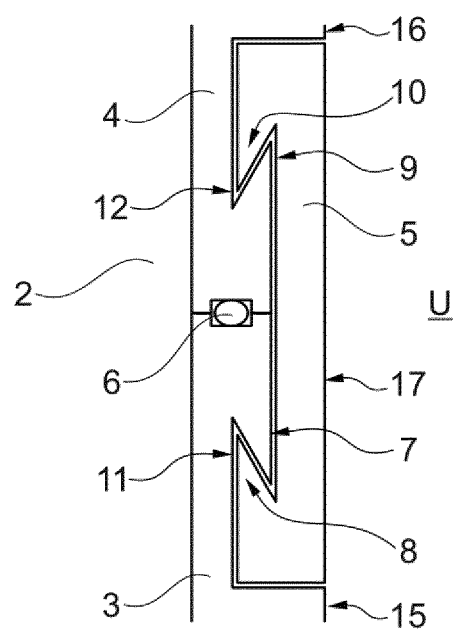
FIG. 6 shows a detailed view of the connection region of the first housing part and the second housing part of the housing of FIG. 1 in a side view.

As is apparent from FIG. 5 or FIG. 6, a first outer side 15 of the first housing part 3 facing away from the housing interior space 2 is configured to be flush with an outer side 17 of the profile rail facing away from the housing interior space 2 in the interconnected state of the first housing 3 part and the second housing part 4. Furthermore, a second outer side 16 of the second housing part 4 facing away from the housing interior space 2 is also configured to be flush with the outer side 17 of the profile rail. Thus, the profile rail 5 is embedded into the housing 1 so as to be flush with the surface. This makes the entire look appear more homogeneous, and a jamming of or injury on parts protruding from the housing surface can be prevented in this manner. A surface-flush design of the housing can be obtained, without any members or edges protruding from the outer surfaces of the housing.

Figure 7:
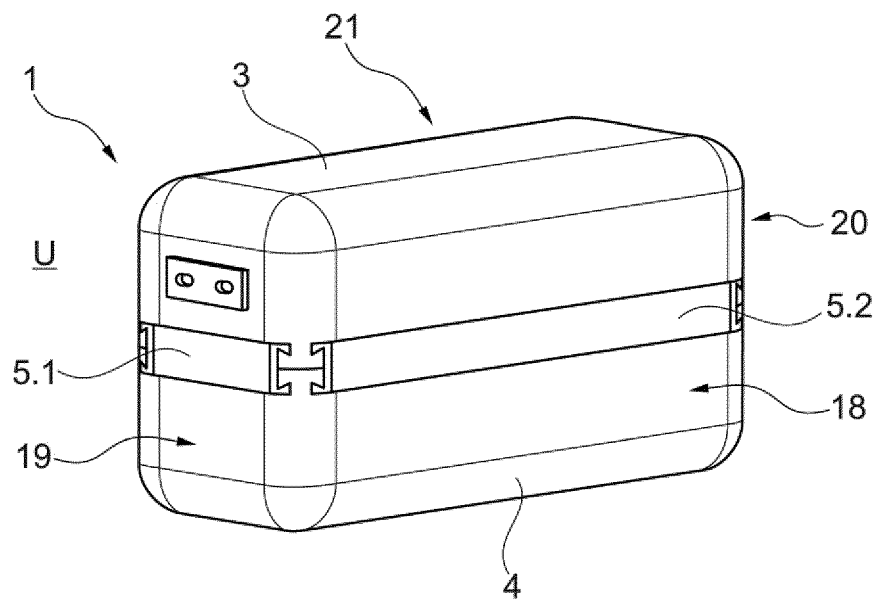
FIG. 7 shows a perspective view of another exemplary embodiment of the housing according to the disclosure.
Figure 8:
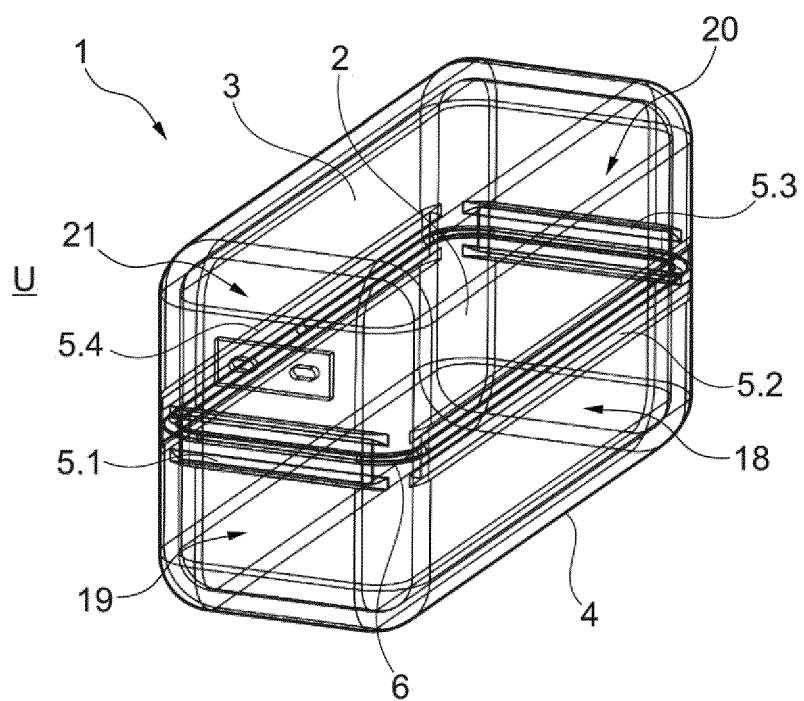
FIG. 8 shows the housing of FIG. 7, with the interior of the housing being illustrated.

FIG. 7 depicts another embodiment of the housing 1 in a perspective view. Here, the housing 1 can be seen in the connected state from the outside. FIG. 8 shows the housing 1 of FIG. 7, with the interior of the housing 1 being illustrated. As becomes apparent from a synopsis of FIG. 7 with FIG. 8, the first housing part 3 and the second housing part 4, in the depicted interconnected state, enclose the housing interior space 2 in such a way that four housing side walls 18, 19, 20, 21 are formed that are substantially perpendicular to one another.

Here, one profile rail 5.1, 5.2, 5.3, 5.4 is provided as a connecting member on each of the four housing side walls 18, 19, 20, 21. A design of a housing that is very easy to handle is thus obtained, because the housing parts 3, 4 can be brought together in a first step and connected with one another in a second step, by inserting or pushing in the profile rails 5.1, 5.2, 5.3, 5.4.

In an embodiment with at least one housing wall that is not provided with a profile rail, a hinge joint, for instance, may alternatively be provided on this housing side wall. In that case, the housing parts may already be movably connected with each other by means of the hinge joint, so that the housing parts can be brought one on top of the other as intended subsequent to closing the hinge joint. In a next step, the housing parts can then be interconnected as intended by at least one profile rail being inserted, as a connecting member, at at least one of the other housing side walls.

The seal 6, which extends completely around the housing interior space 2, is also recognizable in FIG. 8. Alternatively, the seal 6 could also be provided in partial sections, and several straight individual parts of a seal could be provided.

Figure 9:
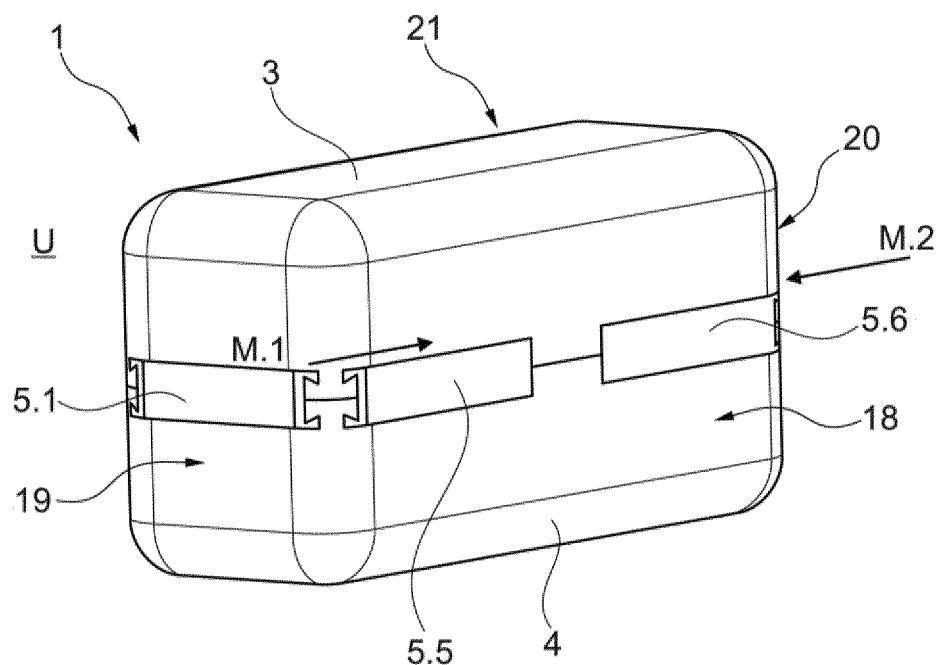
FIG. 9 shows a perspective view of another exemplary embodiment of the housing according to the disclosure.

FIG. 9 depicts another embodiment of the housing 1 in a perspective view. Here, the housing 1 can be seen in the connected state from the outside. The housing 1 differs from the housing 1 shown in FIG. 7 only in that two profile rails 5.5 and 5.6 are provided on the housing side wall 18, instead of only a single one. These profile rails 5.5, 5.6 may, for example, be pushed into their intended accommodating space from two opposite mounting directions M.1 and M.2. Thus, the manufacturing costs for housings in different sizes can be reduced because uniform profile rails in uniform sizes or lengths are being provided for closing off or manufacturing housings of different sizes, including housing parts of different sizes or a housing interior space of different sizes.

Figure 10:
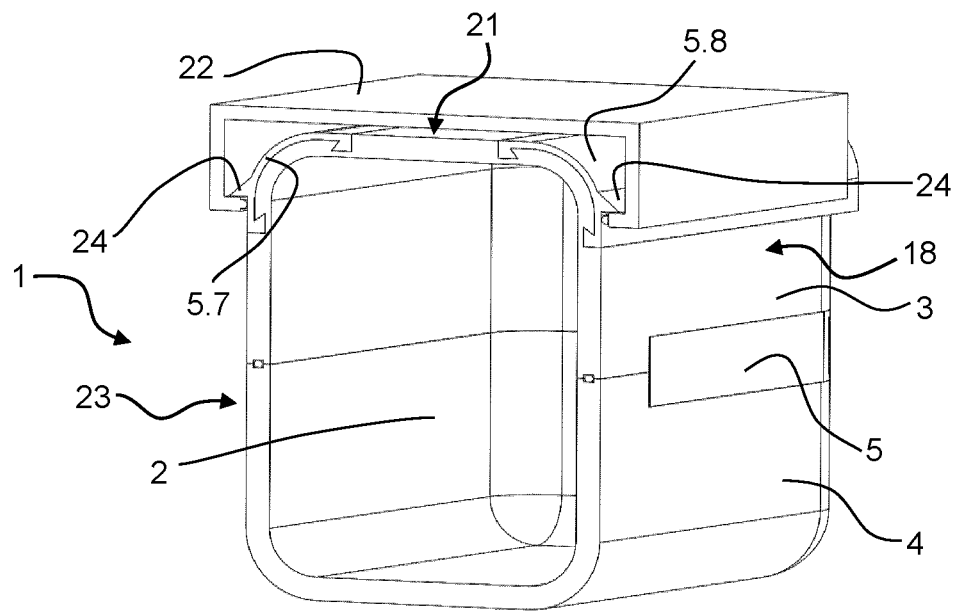
FIG. 10 shows a sectional perspective view of another exemplary embodiment of a housing according to the disclosure.

FIG. 10 shows a sectional perspective view of another exemplary embodiment of a housing 1. Once again, the housing parts 3, 4 are connected by means of the profile rail 5, so that a housing interior space 2 is shielded from the environment.

Moreover, an external retaining device 22 can be seen in FIG. 10. The external retaining device 22 may be the electric bicycle, for instance, to which the housing 1 and the battery, which is disposed therein, for instance, can be positively attached in a simple manner.

In addition to the depicted profile rail 5, the housing 1 also has two further profile rails 5.7 and 5.8. Analogously to the above-described profile rails, these profile rails 5.7, 5.8 may serve for interconnecting the housing parts of the housing 1.

In the exemplary embodiment depicted here, the profile rail 5.7 is arranged such that it reaches over the corner of the housing 1 formed by two housing side walls 21 and 23 disposed adjacent to each other. In turn, the profile rail 5.8 is arranged such that it reaches over the corner of the housing 1 formed by two housing side walls 18 and 21 disposed adjacent to each other. Thus, sharp-edged corners of the housing 1 can be advantageously avoided by means of the profile rails 5.7 or 5.8. In particular, the profile rails 5.7 or 5.8 provided in the corners may be made from a reinforced material in order to provide the housing 1 with special protection at the corners, which are subjected to greater loads.

The resulting corners of the housing 1 may also be configured to be rounded off by the profile rails 5.7 and 5.8 provided in the corners of the housing, so that no sharp right-angled edge is respectively formed between the adjacent substantially perpendicular housing side walls 18 and 21 or 21 and 23.

As is further apparent from FIG. 10, one attachment member in the form of a latching lug 24 for positively connecting the housing 1 to the retaining device 22 is provided in each case on the outer sides of the profile rails 5.7 or 5.8 facing away from the housing interior space 2.

Such a latching lug 24, or an alternative attachment member, could also be mounted on the further profile rail 5, or also, in the previously illustrated and described exemplary embodiments, on one of the other profile rails.

A mechanical interlock of the housing 1 with the environment, or specifically in the presently illustrated exemplary embodiment, with the external retaining device 22, can advantageously be obtained by means of the latching lug 24 or the attachment members in general. In this case, it is particularly advantageous that the attachment members are provided on the profile rails 5.7 and 5.8. Thus, attachment members that are to be mounted additionally, such as additional latching means, may be dispensed with.

Figure 11:
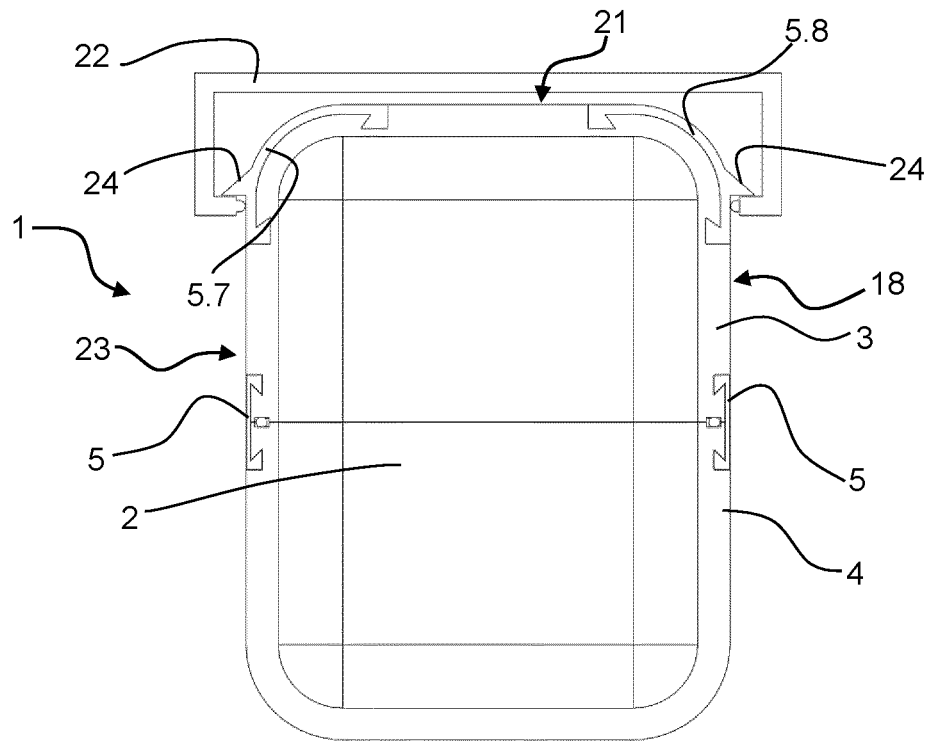
FIG. 11 shows a sectional view of another exemplary embodiment of a housing according to the disclosure.

FIG. 11 shows another exemplary embodiment of the housing 1, which differs from the exemplary embodiment described with reference to FIG. 10 only in that a second profile rail 5 shown on the left-hand side is provided for connecting the two housing parts 3 and 4. Thus, reference may be made to the above description when it comes to the further features. Again, it is noted that the profile rails 5.7 and 5.8 provided in the corners may serve also for connecting housing parts, and not only for attaching an external retaining device 22, as shown in the present case for illustrative purposes.

Figure 12:
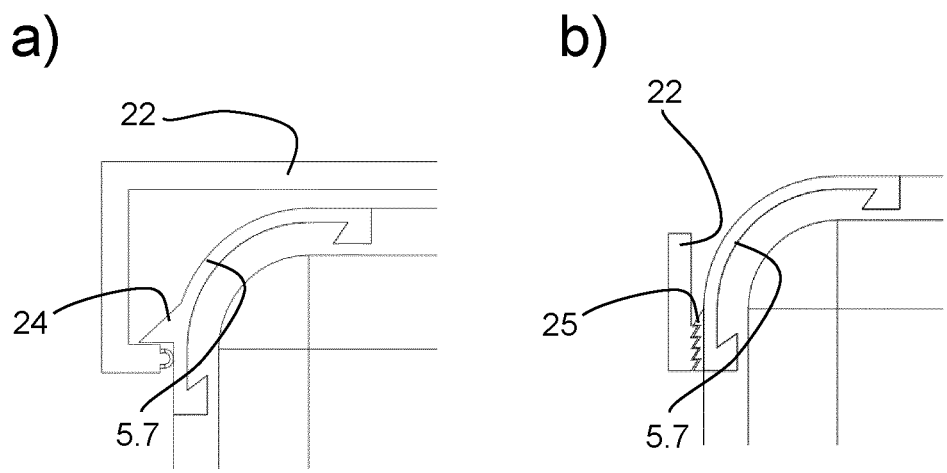
FIG. 12 shows a detail from FIG. 11 in illustration a), and an alternative configuration in illustration b).

FIG. 12 shows in illustration a) a corner of the housing 1 in detail, i.e. the left upper corner according to FIG. 11 or also FIG. 10. As is apparent from detail a) of FIG. 12, the latching lug 24 serves for positively attaching the housing 1 to the retaining device 22. On the one hand, if the housing 1 is used as a battery housing for an electric bicycle, this external retaining device 22 could be mounted on the electric bicycle in a stationary and permanent manner, so that the housing 1 could be attached to the electric bicycle in a simple manner by means of a snap-connection, and detached again without much effort. On the other hand, the retaining device 22 could also be realized by the electric bicycle itself, e.g. be configured integrally with the frame of the electric bicycle.

Illustration b) of FIG. 12 shows an alternative embodiment of an attachment member. Thus, a multi-tooth latching member 25 is provided as an attachment member as an alternative for the above-described latching lug 24. A rapid positive connection between the housing 1 and the external retaining device 22 can thus be obtained in an advantageous manner also by means of such an attachment member. Projections or barbed members are alternative configurations of attachment members.

The invention claimed is:

1. A housing, particularly a battery housing, comprising: at least one first housing part, at least one second housing part, and at least one connecting member connecting the first housing part to the second housing part, wherein the first housing part and the second housing part are configured such that, in an interconnected state, the first housing part and the second housing part separate a housing interior space from an environment situated on the other side of the first housing part and the second housing part, wherein the at least one connecting member is configured as a profile rail engaged with the first housing part and with the second housing part, wherein the first housing part and the second housing part are configured such that the first housing part and the second housing part abut against each other and form a first contact surface and a second contact surface in the interconnected state, wherein at least the first housing part has a first hook portion in the region of the first contact surface, wherein the profile rail has a first claw portion reaching behind the first hook portion in the interconnected state of the first housing part and the second housing part, wherein the first housing part, the second housing part and the profile rail, in the interconnected state, are engaged with each other such that the first claw portion of the profile rail and a first groove of the first housing part disposed on a side of the first hook portion facing towards the housing interior space form an interference fit, wherein the first groove constitutes a recess for the profile rail, wherein the recess is embedded into outer walls of the first and second housing parts, so that the profile rail is embedded into the outer walls of the first and second housing parts.

2. The housing according to claim 1, wherein at least one interference member protruding from the bottom of the first groove, is provided to form the interference fit between the first claw portion and the first groove.

3. The housing according to claim 1, wherein at least one first outer side of the first housing part facing away from the housing interior space, is configured to be flush with an outer side of the profile rail facing away from the housing interior space in the interconnected state of the first housing part and the second housing part.

4. The housing according to claim 1, wherein, in the interconnected state, the at least one first housing part and the at least one second housing part enclose the housing interior space such that the first housing part and the second housing part form at least four housing side walls that are substantially perpendicular to one another, and that at least one profile rail is respectively provided as a connecting member on at least one of the four housing side walls.

5. The housing according to claim 1, wherein, in the interconnected state, the at least one first housing part and the at least one second housing part enclose the housing interior space such that the first housing part and the second housing part form at least four housing side walls that are substantially perpendicular to one another, and that at least two profile rails are provided as a connecting member on at least one housing side wall.

6. The housing according to claim 1 wherein the profile rail is arranged such that the profile rail reaches over a corner of the housing formed by two housing side walls disposed adjacent to each other.

7. The housing according to claim 1, wherein at least one attachment member for positively connecting the housing to a retaining device is provided on the outer side of the profile rail facing away from the housing interior space.

8. The housing according to claim 7, wherein the attachment member is configured as a projection, a latching lug, or a multi-tooth latching member.

9. The housing according to claim 7, wherein a retaining device is positively connected to the housing via the attachment member.

10. The housing according to claim 1, wherein, situated on the side of the profile rail facing towards the housing interior space, at least one seal is disposed between the first housing part and the second housing part.

11. The housing according to claim 1, wherein, the second housing part has a second hook portion in the region of the second contact surface, wherein the profile rail has a second claw portion reaching behind the second hook portion in the interconnected state of the first housing part and the second housing part.

12. The housing according to claim 11, wherein the first housing part, the second housing part and the profile rail, in the interconnected state, are further engaged with each other such that the second claw portion of the profile rail and a second groove of the second housing part disposed on a side of the second hook portion facing towards the housing interior space form an interference fit.

13. The housing according to claim 12, wherein at least one interference member protruding from the bottom of the second groove, is provided to form the interference fit between the second claw portion and the second groove.

* * * * *